(12) United States Patent
Fillingham et al.

(10) Patent No.: US 7,980,508 B1
(45) Date of Patent: Jul. 19, 2011

(54) JET PROPULSION EFFLUX OUTLETS

(75) Inventors: Thomas Fillingham, Near Preston (GB);
Colin Whaites, Near Preston (GB);
William Nash, Near Preston (GB)

(73) Assignee: BAE Systems PLC, Farnborough, Hampshire (GB)

( * ) Notice: Subject to any disclaimer, the term of this patent is extended or adjusted under 35 U.S.C. 154(b) by 0 days.

(21) Appl. No.: 07/496,289

(22) Filed: Mar. 8, 1990

(30) Foreign Application Priority Data

Mar. 14, 1989 (GB) .................................. 8905806.9

(51) Int. Cl.
*B64C 29/00* (2006.01)
*F02K 1/00* (2006.01)
(52) U.S. Cl. ................... 244/12.5; 244/23 A; 244/23 D; 60/232; 239/265.27
(58) Field of Classification Search ............... 244/12.5, 244/23 R, 23 A, 23 B, 23 C, 52, 23 D; 60/232; 239/265.27
See application file for complete search history.

(56) References Cited

U.S. PATENT DOCUMENTS

| 3,056,258 | A | * | 10/1962 | Marchant et al. | ............ 244/12.5 |
| 3,164,337 | A | * | 1/1965 | Hooper | ........................ 244/12.5 |
| 3,209,535 | A | * | 10/1965 | Marchant et al. | ............ 244/12.5 |
| 3,936,017 | A | * | 2/1976 | Blythe et al. | .................. 244/12.5 |
| 4,222,233 | A |   | 9/1980 | Johnson et al. | .................. 60/225 |
| 4,456,203 | A |   | 6/1984 | Louthan | ........................ 244/12.5 |

FOREIGN PATENT DOCUMENTS

| DE | 1085767 | * | 7/1960 | .................... 244/12.5 |
| DE | 2833678 | * | 2/1979 | .................... 244/12.5 |
| FR | 1381085 | * | 10/1964 | .................... 244/12.5 |
| GB | 935272 |  | 8/1963 | |
| GB | 1093914 |  | 12/1967 | |
| GB | 1179788 |  | 1/1970 | |
| GB | 1435567 |  | 5/1976 | |
| GB | 2220177 | * | 1/1990 | .................. 244/23 D |

* cited by examiner

*Primary Examiner* — Timothy D Collins
*Assistant Examiner* — Joseph W Sanderson
(74) *Attorney, Agent, or Firm* — Nixon & Vanderhye P.C.

(57) ABSTRACT

A V/STOL aircraft includes an aft by-pass powerplant 28 having an aft, rearwardly directed nozzle 30 and twin transverse vectorable nozzles 32. A duct 29 extends forwardly of the powerplant and terminates in a vectorable nozzle 16. The duct supplies relatively cool by-pass air to the nozzle.

16 Claims, 2 Drawing Sheets

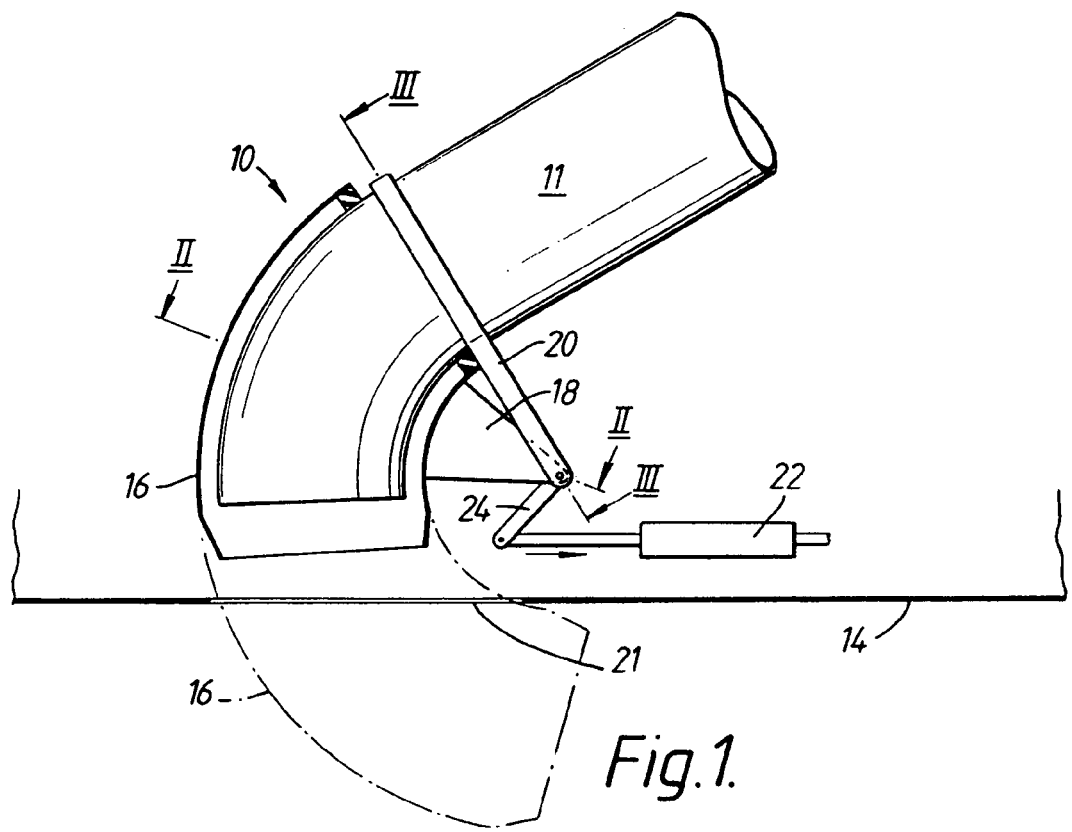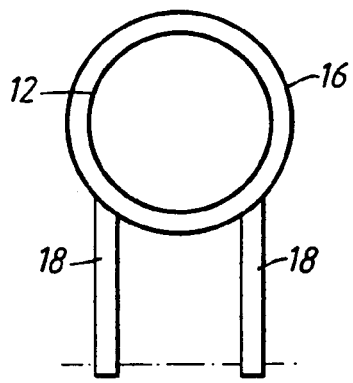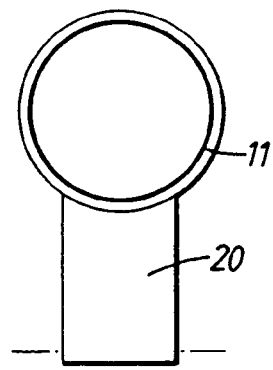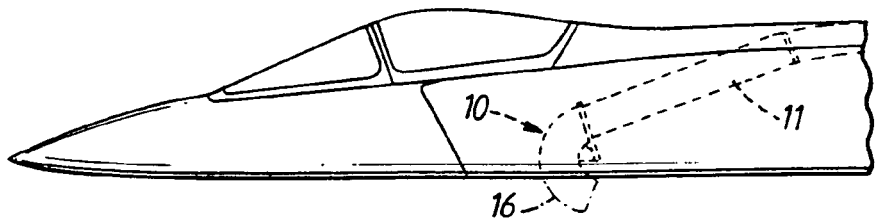
Fig.1.
Fig.2.
Fig.3.
Fig.4.

JET PROPULSION EFFLUX OUTLETS

This invention relates to jet propulsion efflux outlet assemblies and to aircraft incorporating such assemblies.

V/STOL aircraft have been proposed which incorporate a RALS (remote augmented lift system). Such aircraft include a downwardly directed outlet assembly located forwardly of the powerplant which is supplied with reheated fan air during V/STOL modes of flight. Reheat has been essential in earlier RALS proposals because, without reheat, the flow delivered to the outlet assembly would be insufficient to develop the required thrust. It will be understood that the reheat system means that the outlet assembly is of large diameter and bulky to accommodate the reheat equipment, fuel supply and burner arrangements and to withstand the reheat temperatures (typically in excess of 1000° C.). In a modern fighter aircraft space and weight are at a premium, and the additional space and weight demands of a system incorporating a vectorable RALS nozzle mean that such a system is difficult to install. In existing RALS proposals, it is thus not practical to vary the direction in which efflux exhausts from the outlet assembly.

British Patent Specifications 1,435,567, 1,179,788 and 1,093,914 all show primary efflux outlets arranged either transversely or aft of the propulsion powerplant and capable of deflecting the thrust generated thereby. Each of the efflux outlets exhausts hot efflux from the powerplant and must be designed to withstand extremely high operating temperatures.

British Patent Specification No. 935,272 describes a separate lift engine with a vectorable nozzle which is used in conjunction with a principal powerplant.

With the new generation of variable by-pass ratio engines the mass-flow of by-pass air that can be delivered is substantially increased and studies by the applicants have shown that such engines may be adapted to provide a remote lift system which does not require reheat to provide the desired remote thrust. The applicants have designed an arrangement which allows a smooth transition to or from fully wing supported flight and which contributes minimally to the drag of the aircraft, whilst occupying a small volume in the aircraft body.

According to one aspect of this invention, an aircraft of at least one of the vertical and short take-off type, which includes a powerplant, longitudinally spaced forward and rearward outlet assemblies each for receiving at least a part of the efflux from said powerplant, wherein said forward outlet assembly is spaced generally forwardly of said powerplant and comprises delivery duct means, an outlet nozzle means for generating at least a component of lift, and means for varying the direction in which efflux exhausts from said outlet nozzle means.

According to another aspect of this invention, there is provided an aircraft of at least one of the vertical and short take-off type, including a by-pass powerplant and, located forwardly thereof, a forward outlet assembly for directing by-pass air generally downwardly, wherein said forward outlet assembly does not include reheat means.

According to a further aspect of this invention, there is provided an aircraft of at least one of the vertical and short take-off type, including a by-pass powerplant disposed in a rearward region of the aircraft, an aft propulsion nozzle for exhausting hot or mixed propulsion efflux generally rearwardly, at least one transverse vectorable nozzle for exhausting hot or mixed propulsion efflux, and a forward, vectorable nozzle spaced forwardly of said powerplant for directing relatively cool efflux in a vectorable downwards direction, for providing a significant proportion of the lift required for vertical or short take-off.

The invention will now be described by way of non-limiting example, reference being made to the accompanying drawings, in which:

FIG. 1 is a side view of an example of a jet propulsion efflux outlet assembly in accordance with the invention;

FIG. 2 is a section view on the outlet assembly taken on lines II-II of FIG. 1;

FIG. 3 is a section view taken on lines III-III of FIG. 1;

FIG. 4 is a side view of the forward part of a V/STOL aircraft incorporating the outlet assembly of FIGS. 1 and 2;

Figure 5:
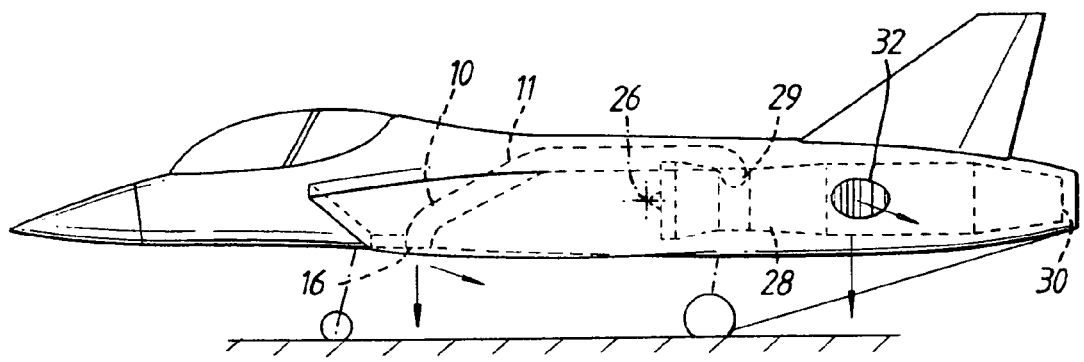
FIG. 5 is a side view of the complete aircraft of FIG. 4.

Referring initially to FIGS. 1 to 4, the jet propulsion efflux outlet assembly 10 includes a delivery duct 11 which delivers propulsion fluid to the assembly during V/STOL modes, the duct being of generally circular cross-section and having a curved downstream portion 12 which terminates inboard of the lower surface 14 of the aircraft. An outlet nozzle 16 of slightly larger generally circular cross-section and having a similar curvature to that of the downstream portion 12 is telescopically mounted with respect to the downstream portion by a bracket 18 pivotally mounted on an extension 20 of the duct 10 for movement about a pivotal axis generally concentric with the centres of curvature of said outlet nozzle 16 and said downstream portion 12. The outlet nozzle 16 is sealed to said downstream portion by a sliding seal 20. The outlet nozzle 16 is movable between a retracted position in which it does not protrude from the lower aircraft surface (illustrated in full lines in FIG. 1) and an extended position (illustrated in dotted lines in FIG. 1) in which it protrudes from an aperture 21 in the aircraft lower surface. The outlet nozzle 16 is moved by a ram 22 having one end attached to the aircraft structure and the other end pivotally attached to a crank arm 24 connected to the bracket 18. In the retracted position the outlet nozzle exhausts substantially vertically downwards and in the extended position it exhausts in a direction at about 20° to the horizontal.

Figure 6:
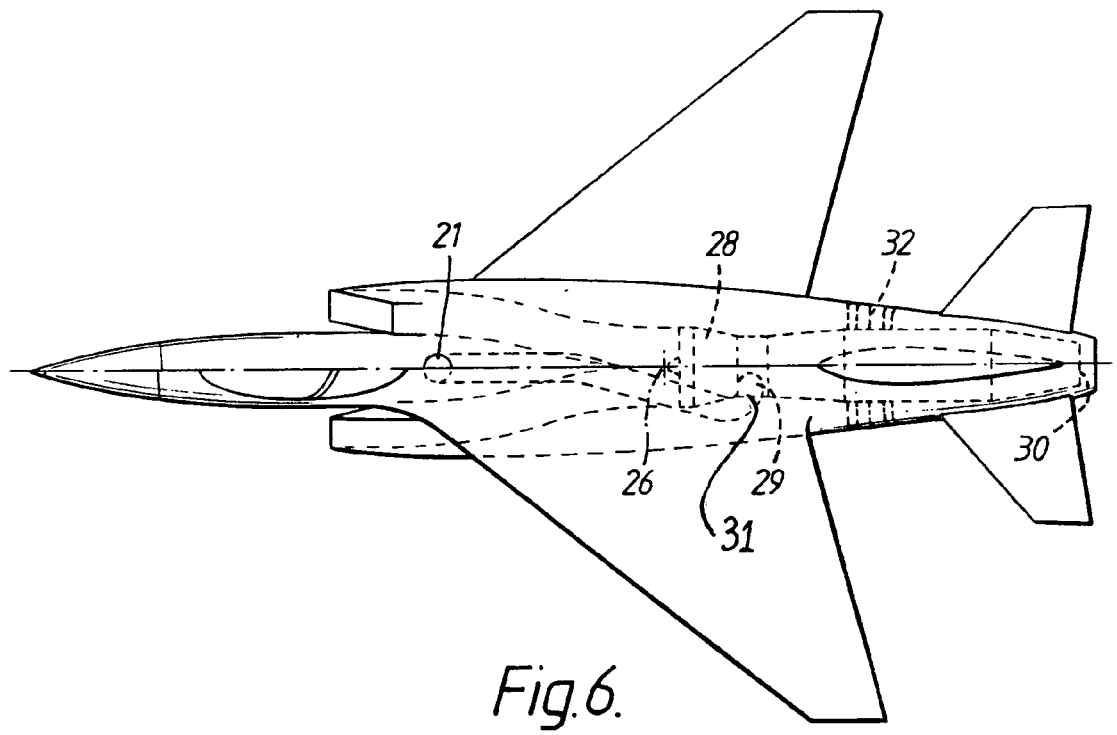
FIG. 6 is a composite plan view of the aircraft of FIG. 4, with upper and lower halves of the Figure showing bottom plan and top plan views respectively.

The V/STOL aircraft 24 illustrated in FIGS. 4 to 6 incorporates an outlet assembly of the type illustrated in FIGS. 1 to 3 located well forward of the centre of gravity 26 of the aircraft for exhausting by-pass air in a generally downwards vectorable direction when the aircraft is in a vertical/short take off or landing mode.

The aircraft 24 includes a powerplant 28 located in an aft body portion and the powerplant is of the variable by-pass type, including variable camber, variable incidence blades.

The powerplant 28 includes a collar assembly 29 for receiving relatively cool by-pass air direct from the fan of the powerplant. The collar assembly includes two outlet ports 31 each controlled by a valve (not shown) e.g. a simple vane valve, and each delivering air into the bifurcated upstream portion of the delivery duct 11. The powerplant 28 also includes a conventional rearwardly directed nozzle 30 and a pair of transverse vectorable nozzles 32. The nozzles 32 may be of the rotating vane type and be capable of exhausting between a vertically downwards direction and a direction at about 20° to the horizontal.

In use, the powerplant may be controlled so that, for normal cruise flight, the cool by-pass air and hot core efflux are mixed and exhausted through the rearwardly directed nozzle 30. In this mode, the aperture 21 in the aircraft lower surface is closed by a flap or door (not shown).

For vertical/short take off or landing, the powerplant is controlled so that all of the hot core efflux is exhausted through the transverse vectorable nozzles 32, and the cool by-pass air is exhausted through the forward outlet nozzle 16 which is positioned in its retracted position to generate a vertical lift component with the associated flap or door open.

A typical design of powerplant 28 may be a variable by-pass and pressure ratio engine with a fan section having variable camber, variable incidence blades capable of delivering about 400 lb/sec of air (fan pressure ratio of about 4½:1) in normal flight and 550 lb/sec of air (fan pressure ratio of about 5½:1) in lift mode. The relatively cool by-pass air may have a temperature of about 200° C., so that the outlet nozzle 16 and the delivery duct 10 may be uncooled and formed of lightweight, small diameter non-metallic ducting. Because of the low fan air temperature and high pressure ratio, the duct may be smaller than that required for conventional RALS systems, whilst still providing a sufficient flow of unreheated air to generate the required lift thrust.

The efflux outlet assembly 10 provides a simple, lightweight, small diameter, compact arrangement which allows the efflux direction to be vectored but which does not protrude from the aircraft surface during normal forward flight. This allows the efflux to be vectored with minimal fuselage ablation, and the low mass of the movable part of the nozzle 16 and the absence of reheat equipment mean that the nozzle may easily be vectored.

It will be understood that the efflux outlet assembly 10 may be used in configurations of aircraft other than that illustrated, and that the powerplant 28 may be configured or operated differently from the ways described herein. For example, the outlet nozzle 16 and the nozzles 32 may be vectored asynchronously. Also, the vectoring angle of 20° may be different dependent on the particular application and geometry of the aircraft.

The invention claimed is:

1. An efflux system for an aircraft of at least one of the vertical and short take-off type, which includes a powerplant, said system comprising:
    longitudinally spaced forward and rearward outlet assemblies each for receiving at least a part of an efflux from said powerplant,
    wherein said forward outlet assembly is spaced generally forwardly of said powerplant and comprises delivery duct means receiving said part of said efflux, an outlet nozzle means, telescopically coupled to a portion of said delivery duct means, said outlet nozzle means having at least a portion having a complementary shape to said portion of said delivery duct means, for generating at least a component of lift when in a first position, and means for varying a direction in which efflux exhausts from said outlet nozzle means by telescopically moving said outlet nozzle means with respect to said delivery duct means between said first position and a second position.

2. An aircraft according to claim 1, wherein said delivery duct means has a curved downstream portion, said outlet nozzle means includes an upstream portion of complementarily curved shape, and said outlet nozzle means is mounted for pivoting movement between a retracted position and a stowed position, whereby a direction in which said efflux exhausts is angularly adjusted by said pivoting movement.

3. An aircraft of at least one of the vertical and short take-off type, comprising:
    a body portion;
    a powerplant for generating efflux;
    a rearward outlet assembly positioned in a substantially rearward portion of said body for receiving and exhausting at least a part of the efflux from said powerplant;
    a forward outlet assembly positioned forward to said powerplant for receiving and exhausting at least a part of the efflux therefrom; wherein the forward outlet assembly comprises delivery duct means having a curved downstream portion, outlet nozzle means having a complimentarily curved upstream portion and mounted concentrically with said delivery duct means for telescopic movement therewith, and vectoring means for telescopically moving said outlet nozzle means between a first position in which the outlet nozzle means does not substantially protrude from the body and is directed generally downwardly so as to cause the efflux exhausted therefrom to generally produce lift, and a second position in which the outlet nozzle means protrudes from the body and is directed generally rearwardly so as to cause the efflux exhausted therefrom to produce lift and forward thrust.

4. An aircraft according to claim 3, which further includes an aft, rearwardly directed, outlet nozzle for generating thrust for forward flight.

5. An aircraft according to claim 4, wherein said powerplant is operable to provide a flow of relatively cool efflux and a flow of relatively hot efflux, and control means are provided for directing said cool efflux to mix with said hot efflux and thence to said aft, rearwardly directed outlet nozzle for cruise flight and for directing said cool efflux to said forward outlet assembly for vertical and/or short take off or landing.

6. An aircraft according to claim 3, wherein said powerplant is located generally aft of the centre of gravity of the aircraft.

7. An aircraft as in claim 1 wherein said telescopic coupling is such that in the first position, said outlet nozzle means covers said portion of said delivery duct means and points generally downwardly, and in said second position said outward nozzle means covers only an end of said delivery duct means and points in a substantially horizontal direction.

8. An aircraft as in claim 1 wherein said outlet nozzle means does not protrude beyond a body of said aircraft when in said first position but generates a component of said lift.

9. An aircraft does in claim 8 wherein said outlet nozzle means does protrude from said body of said aircraft when in said second position and produces a component of force in a direction near horizontal.

10. An aircraft of at least one of the vertical and short take-off type, including a by-pass powerplant and, located forwardly thereof, a forward outlet assembly for directing by-pass air generally downwardly, wherein said forward outlet assembly does not include reheat means.

11. An aircraft according to claim 10, wherein said by-pass powerplant is located generally aft of the centre of gravity of the aircraft.

12. An aircraft as in claim 10 wherein said forward outlet assembly further comprises delivery duct means receiving at least part of an efflux from said bypass powerplant; outlet nozzle means, telescopically coupled to a portion of said delivery duct means, said outlet nozzle means having at least a portion having a complementary shape to said portion of said delivery duct means so that said outlet nozzle means in a first position covers said delivery duct means and directs said bypass air in a first direction, and in a second position said outlet nozzle means does not cover said delivery duct means and directs said bypass air in a second direction.

13. An aircraft according to claim 3, whereby the rearward outlet assembly includes means for angularly adjusting the direction in which an efflux exhausts therethrough.

14. An aircraft according to claim 3, wherein the rearward outlet assembly exhausts hot or mixed propulsion efflux received from the powerplant generally rearwardly, and the forward outlet assembly exhausts relatively cool efflux received from the powerplant generally downwardly and/or rearwardly for providing a significant proportion of lift required for vertical or short take-off.

15. An apparatus as in claim 3 further comprising at least one vectorable nozzle positioned alongside the powerplant for receiving and exhausting a hot or mixed propulsion efflux received therefrom.

16. A device according to claim 3, wherein in normal cruise flight, the outlet nozzle means is contained within the body and does not receive efflux from said powerplant.

* * * * *